Figures 1, 2:
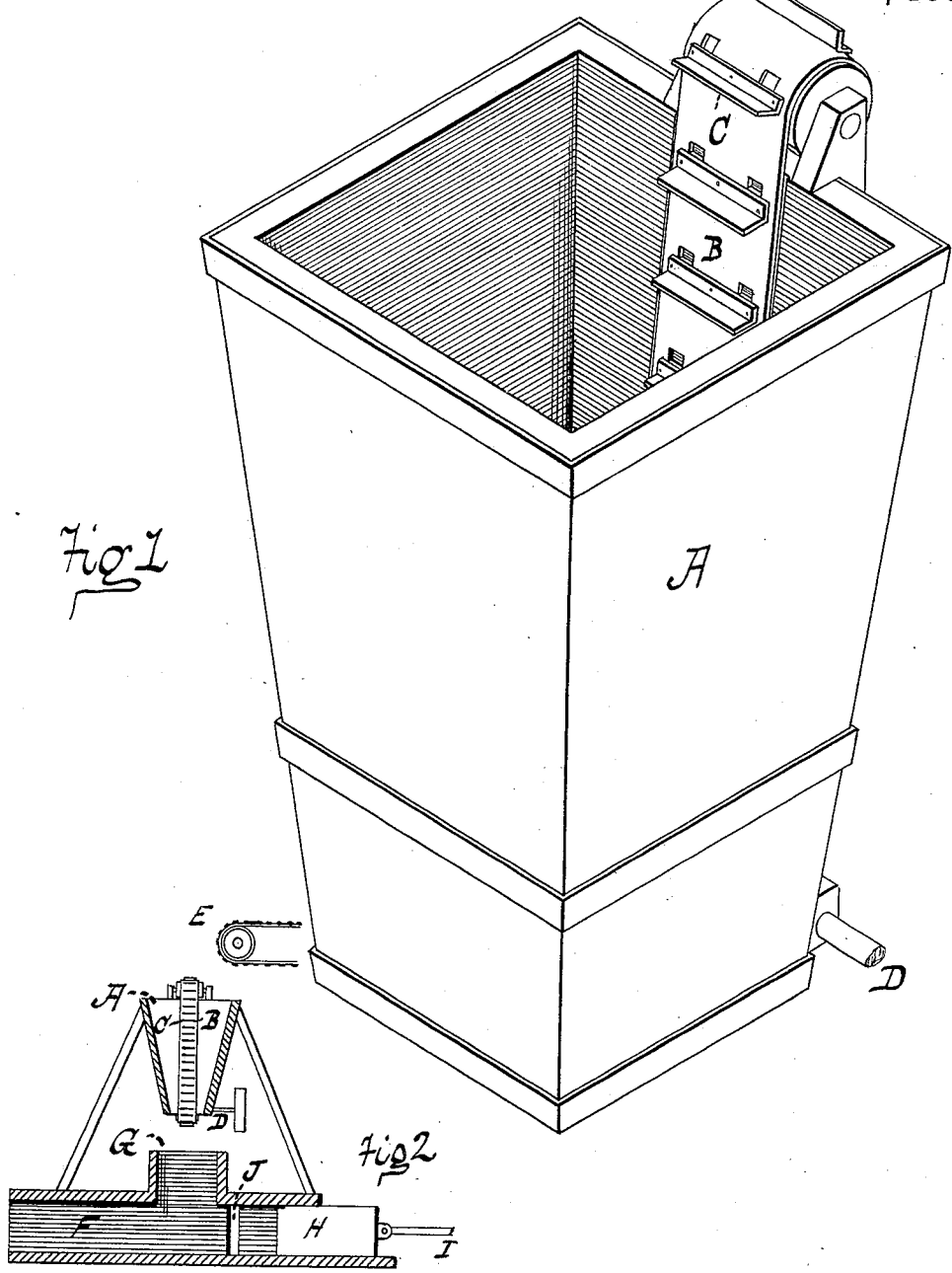

(No Model.)

J. L. RITER.
CONVEYER FOR BALING MACHINES.

No. 266,317. Patented Oct. 24, 1882.

WITNESSES:
John Lorenz
A. J. Lytle

John S. Riter INVENTOR
by
James W. See
ATTORNEY

UNITED STATES PATENT OFFICE.

JOHN L. RITER, OF BROWNSVILLE, INDIANA.

CONVEYER FOR BALING-MACHINES.

SPECIFICATION forming part of Letters Patent No. 266,317, dated October 24, 1882.

Application filed April 3, 1882. (No model.)

*To all whom it may concern:*

Be it known that I, JOHN L. RITER, of Brownsville, Union county, Indiana, have invented certain new and useful Improvements in Conveyers for Baling-Machines, of which the following is a specification.

In the accompanying drawings, Figure 1 is a perspective view of my improved conveyer, and Fig. 2 a vertical section, illustrating the application of the device to a baling-machine.

This invention relates to a device for conveying hay, straw, &c., to a baling-machine, and for condensing and compacting it during such conveyance.

In feeding straw, &c., from a fairly settled and compact stack to a baling-machine by means of a pitchfork the straw is very much opened up and loosened, thus increasing the work of compacting which the baling-machine must accomplish. If the pitchfork be discarded and the straw delivered to the baling-machine by hand, the work will be greatly facilitated, as the hand operation involves a grasping and compressing action, the opposite of that effected by the pitchfork. A thrashing-machine opens up and delivers its straw in a very loose condition, and if baled at once much extra work is imposed on the baling-machine. My device conveys a stream of straw to a baler, being fed by fork or by the straw-carrier of a thrasher, and condenses the stream sidewise while being conveyed.

In the drawings, A is a tapering conduit, and B is an endless band operated in an obvious manner by shaft D. The band carries the projections C. Loose straw received into the large end of the conduit is urged downward by the action of the band and projections, and in moving onward into the tapering conduit becomes condensed sidewise and issues from the small end of the conduit in a more or less compacted stream. When a very great condensation of the straw is desired other propelling-bands may be arranged at other sides of the conduit, so as to act conjointly. I do not confine myself to the form of propelling device shown; nor do I confine myself to placing the conduit in a vertical position, as shown.

In Fig. 2 the device is shown in connection with a baling-machine and with the straw-delivery of a thrasher. G is the receiving-port of the baler. F is the bale-mold; H, the baling-plunger; I, the actuating-rod, and J the slot for the insertion of the boards between the bales. This type of baling-machine is old and well known and need not be described. The conveyer is seen fixed above the baler and arranged to discharge into its receiving-port. E is the tail of the straw-carrier of a thrasher, arranged to drop its straw into the conveyer. In a case of this kind the conveyer may be driven by belt from the baler or from the thrasher. The wide and open stream of straw flowing from the thrasher is delivered into the baler in a stream of decreased size and greatly condensed.

I claim as my invention—

The combination, with the straw-deliverer of a thrasher, the receiving-port of a baling-machine, and a propelling device adapted and arranged to move the straw from the thrasher toward the baling-machine, of a straw-conduit having convergent sides, substantially as and for the purpose set forth.

JOHN L. RITER.

Witnesses:
J. W. SEE,
JOHN LORENZ.